United States Patent [19]

McCarty

[11] Patent Number: 5,211,539
[45] Date of Patent: May 18, 1993

[54] APPARATUS FOR INDICATING THE PITCH OF TURBOFAN BLADES

[75] Inventor: Frederick B. McCarty, San Pedro, Calif.

[73] Assignee: Allied-Signal Inc., Morris Township, N.J.

[21] Appl. No.: 699,398

[22] Filed: May 13, 1991

[51] Int. Cl.$^5$ .................................................. F01D 1/24
[52] U.S. Cl. ............................................ 416/61; 416/147; 416/170 R; 250/231.13; 250/231.16; 324/207.18; 324/207.19; 324/207.25; 324/207.22; 340/870.25; 340/870.29; 340/870.31
[58] Field of Search ............... 416/3, 61, 147, 159, 416/160, 170 R; 250/231.1, 231.15, 231.16, 231.12, 231.13; 324/207.18, 207.19, 207.25, 207.22; 340/870.75, 870.28, 870.29, 870.31

[56] References Cited

U.S. PATENT DOCUMENTS

| | | | |
|---|---|---|---|
| 2,403,899 | 7/1946 | Ammen | 416/61 X |
| 2,417,176 | 3/1947 | Ratie | 416/61 |
| 2,586,540 | 2/1952 | Holden | 250/231.13 X |
| 2,705,537 | 4/1955 | Nichols | 416/61 |
| 2,947,168 | 8/1960 | Yang | 250/231.13 X |
| 3,040,222 | 6/1962 | Kunz | 340/870.25 X |
| 3,309,525 | 3/1967 | Johnson, Jr. | 250/231.16 |
| 3,636,364 | 1/1972 | Stempler et al. | 250/231.16 X |
| 3,688,570 | 9/1972 | Burke, Jr. | 250/237.6 X |
| 3,873,235 | 3/1975 | Mendelson | 416/61 X |
| 3,900,274 | 8/1975 | Johnston et al. | 416/160 X |
| 4,083,518 | 4/1978 | Garrison et al. | 416/38 X |
| 4,215,301 | 7/1980 | Mason . | |
| 4,224,515 | 9/1980 | Terrell . | |
| 4,308,500 | 12/1981 | Avins | 250/231.16 X |
| 4,320,293 | 3/1982 | Guretzky | 250/231.13 |
| 4,449,191 | 5/1984 | Mehnert | 250/231.16 X |
| 4,491,776 | 1/1985 | Veale . | |
| 4,534,524 | 8/1985 | Aldrich | 416/160 X |
| 4,691,192 | 9/1987 | Baker | 250/231.16 X |
| 4,878,809 | 11/1989 | Ames | 416/160 X |
| 4,965,503 | 10/1990 | Watanabe et al. . | |
| 5,014,560 | 5/1991 | Hutchison et al. | 250/231.1 X |
| 5,063,291 | 11/1991 | Buehring | 250/231.16 |

*Primary Examiner*—Edward K. Look
*Assistant Examiner*—Todd Mattingly
*Attorney, Agent, or Firm*—Hugh P. Gortler; Robert A. Walsh

[57] ABSTRACT

Apparatus indicates changes in blade pitch of variable pitch blades by detecting relative displacements of first and second members of a blade pitch actuator. The members are selectively displaced to change the pitch of the blades. The apparatus includes sensors which provide output signals to a microprocessor, which determines displacement of each member with respect to a frame of reference. The microprocessor takes the difference between the displacements of the two members to determine the relative displacement, which is indicative of a change in blade pitch.

15 Claims, 4 Drawing Sheets

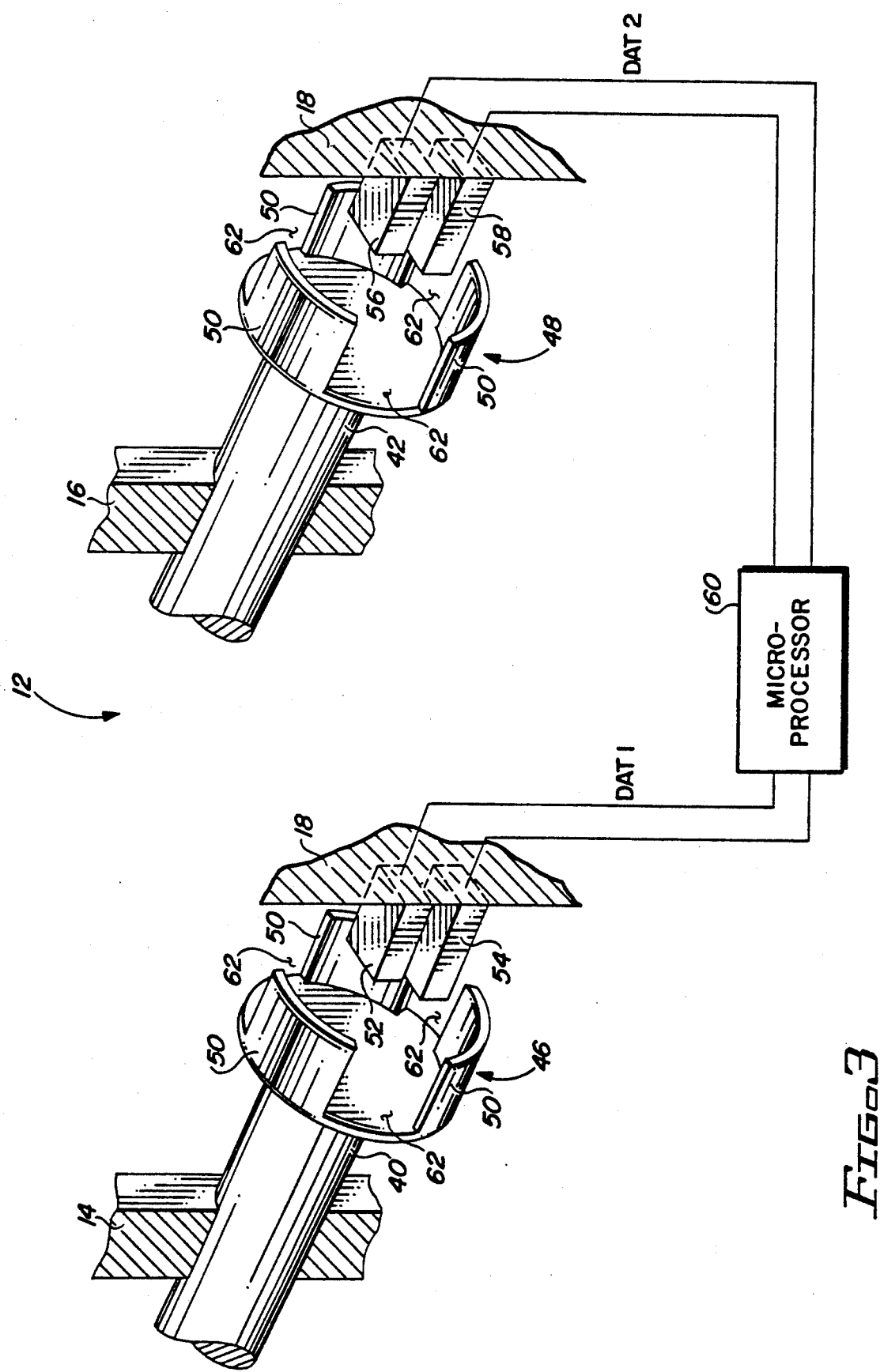

APPARATUS FOR INDICATING THE PITCH OF TURBOFAN BLADES

FIELD OF THE INVENTION

The present invention relates to apparatus for indicating the pitch of adjustable pitch blades of a variable-pitch turbofan engine.

BACKGROUND OF THE INVENTION

Turbofan engines have proven to be desirable for commercial aircraft, which travel at subsonic speeds. A turbofan engine transfers energy from a jet stream of gas to a turbine shaft; the shaft turns a ducted fan which moves a mass of cold air, providing a thrust that propels the aircraft. The thrust is varied by changing the pitch of the fan blades. During takeoff, when high thrust is required, the pitch of the blades is adjusted to produce maximum engine torque. At cruise, when lower speeds are required, the blade pitch is adjusted to reduce engine torque. During landings, the pitch is adjusted to produce a reverse thrust, which brakes the aircraft. Among the advantages offered by the turbofan engine is low noise level, since jet velocities are reduced. Further, the reverse thrust capability permits the elimination of a thrust reversal mechanism. This offsets to a certain degree the weight and complexity introduced by the control system that varies blade pitch. Additionally, fuel efficiency of the turbofan engine is increased since blade pitch can be varied to cater to ever-changing flight conditions. It is claimed that fuel consumption can be increased by as much as twelve percent by adjusting the pitch of the blades.

The blade pitch is adjusted by a mechanical blade pitch actuator, which can be mechanically, hydraulically or pneumatically driven. In a typical mechanical blade pitch actuator, the difference of rotary displacement between two shafts, a fan drive shaft and a control shaft, is used to adjust the pitch of the blades. The control shaft is selectively rotated at a rate different than that of the fan shaft until the desired degree of blade angle is realized. For instance, when the control shaft is rotated at an angular rate greater than that of the fan shaft, the blade pitch is increased. At a slower rate, the blade pitch is decreased. When the control shaft and fan shaft are rotated at the same angular rate, the blade pitch is maintained.

The blade pitch actuator should include apparatus to measure the blade pitch as the fan blades are being adjusted. The measurement should be precise, and error due to vibrations that occur when the engine is running should be minimized. Further, the actuator should be able to measure blade pitch with constant precision regardless of whether the engine is running or stopped.

SUMMARY OF THE INVENTION

The present invention relates to apparatus for measuring a change in pitch of variable pitch blades, whose pitch is adjusted by at least two members that are selectively rotated at different angular rates. The apparatus in accordance with the present invention comprises detecting means, responsive to the rotation of the two members, for detecting the angular position of each one of the two members. The output of the detecting means is processed by processing means, which determines net displacement of each one of the at least two members, and determines the difference between the net displacements. The difference is indicative of the change in blade pitch.

BRIEF DESCRIPTION OF THE DRAWINGS

FIG. 3 is a detailed perspective view of a code wheel and a magnetic sensor, which form a part of the blade pitch measurement apparatus in accordance with the present invention;

DETAILED DESCRIPTION OF THE PREFERRED EMBODIMENT

The present invention is suitable for use with any type of blade pitch actuator employing members that are selectively rotated at a different rates to adjust the pitch of the blades. However, the present invention is especially suitable for use with a "Quad Mode Actuator", which is disclosed in copending application Ser. No. 07/700,385 filed concurrently herewith and assigned to Allied-Signal, Inc., the assignee herein. This application is incorporated herein by reference. Accordingly, the present invention will be described in connection with a Quad Mode Actuator.

Figure 1:
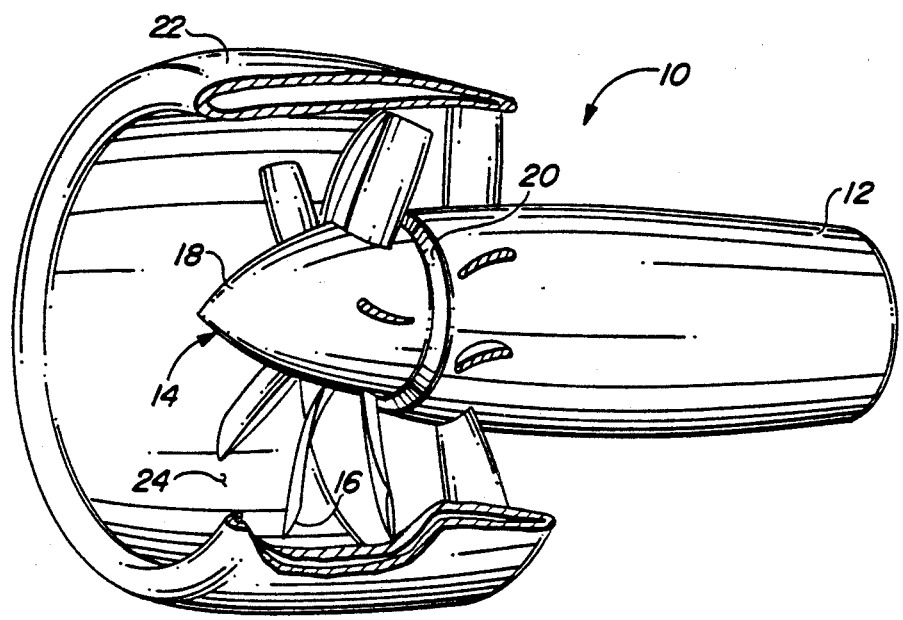
FIG. 1 is a perspective view of a ducted fan propulsion unit.

Referring to FIG. 1, there is shown a ducted fan propulsion unit 10, which includes a core engine 12 and a variable-pitch fan assembly 14. The core engine 12 has a turbine-type power plant that includes a compressor section (not shown), combustion section (not shown) and a turbine section (not shown). These sections are arranged in serial flow relation on either a single shaft or a dual shaft. The fan assembly 14 includes a plurality of fan blades 16 that are circumferentially disposed about an fan hub 18 and extend radially therefrom. The fan assembly 14 is connected to the forward end of the engine core 12 adjacent its compressor inlet 20. A fan nacelle 22 circumscribes the fan assembly 14 to form an air inlet duct 24.

Figure 2:
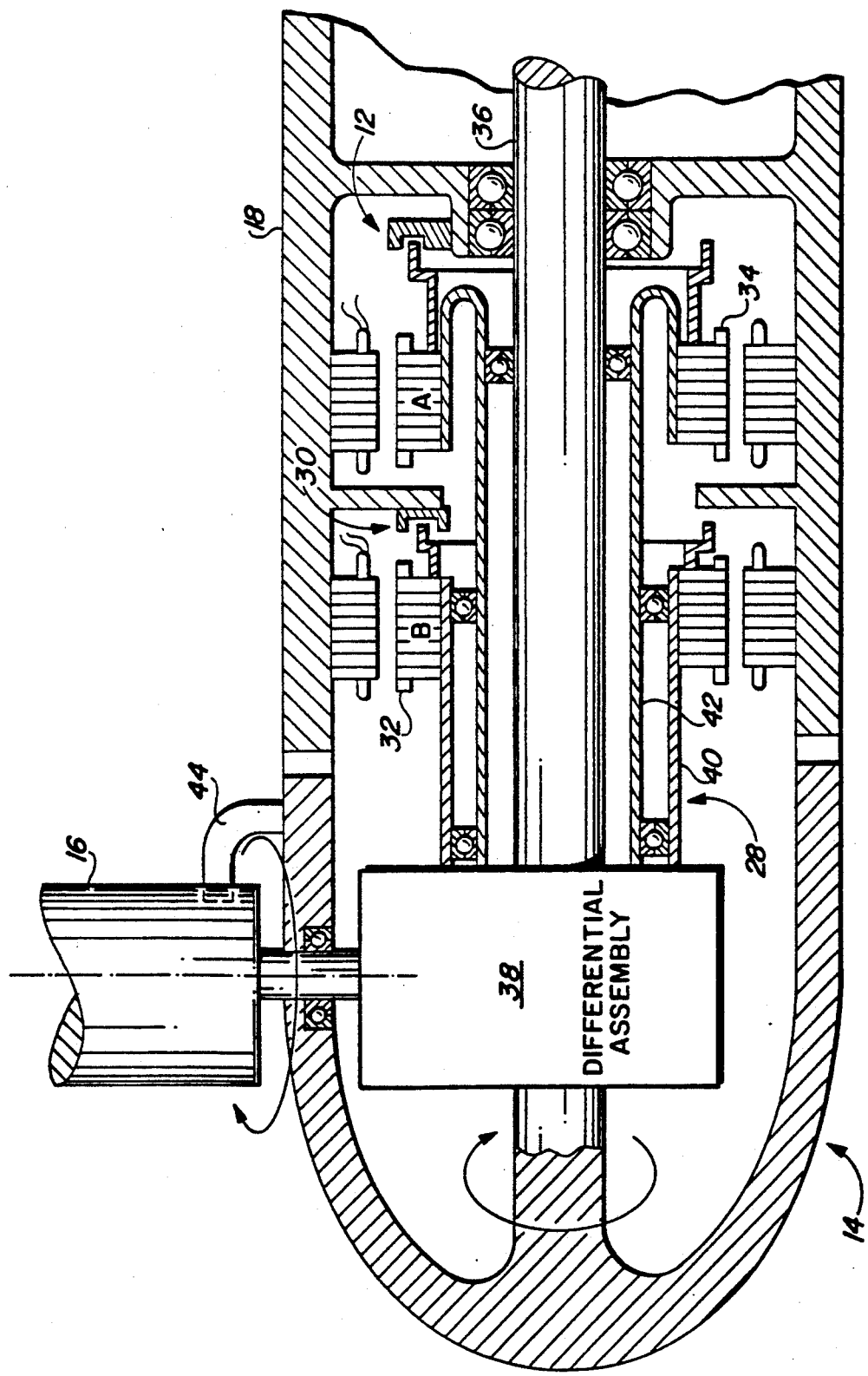
FIG. 2 is a cross-sectional view of a Quad Mode Actuator and blade pitch measurement apparatus in accordance with the present invention.

FIG. 2 shows only the elements of the Quad Mode Actuator 28 that are essential to understanding the present invention. Located within the fan hub 18 of the fan assembly 14, aft the fan blades 16, the Quad Mode Actuator 28 employs first and second squirrel cage rotors 32 and 34 that are turned synchronously with an engine shaft 36 except when the pitch of a blade 16 is being changed. The respective stators for the first and second rotors 32 and 34 are excited with either DC or three-phase AC current, depending upon whether braking or motoring is desired. The first and second rotors 32 and 34 are coupled to a differential assembly 38 via first and second control shafts 40 and 42, respectively. The differential assembly 38, which revolves at the speed of the engine shaft 36, adjusts the pitch of the fan blades 16 when first and second rotors 32 and 34 are turned relative to each other. The differential assembly 38 includes planetary reduction gears and a linkage. For example, when the first and second rotors 32 and 34 are locked together, the first and second rotors rotate synchronously with the engine shaft 36 and no adjustments are made to the blade pitch. However, when the first and second rotors 32 and 34 are unlocked, a DC excitation to one stator causes the corresponding rotor to brake. The relative motion causes the pitch of the blades 16 to be adjusted. The blade measurement apparatus 30 communicates with the first and second rotors 32 and 34 to determine the pitch of the blades 16. The pitch of each fan blade 16 is limited by a blade stop 44.

During flight or on the ground, the blade pitch is changed only occasionally and the adjustment is completed in a few seconds. Most of the time, the first and second rotors 32 and 34 have no rotation relative to each other but rotate synchronously with the engine shaft 36. Thus, there is a speed bias ranging from zero to 2000 rpm on both the first and second rotors 32 and 34. The speed bias depends upon whether the engine shaft 36 is turning, idling or running under load.

Referring now to FIG. 3, the blade pitch measurement apparatus 30 includes first and second code wheels 46 and 48, which are coupled to the shafts 40 and 42 of the first and second rotors 32 and 34, respectively. A number n of tabs 50 are disposed about each code wheel 46 and 48. The blade measurement apparatus 30 also includes first, second, third and fourth proximity sensors 52, 54, 56 and 58, which are all mounted to a stationary frame, e.g., the fan hub 18. The fan hub 18 provides a stationary frame of reference. The first and second sensors 52 and 54, which are in a quadrature phase relationship, cooperate to detect the presence or lack thereof of the tabs 50 disposed about the first code wheel 46. This indicates the current angular position of the first rotor 32. The third and fourth sensors 56 and 58, which are in a quadrature phase relationship, cooperate to detect the presence or lack thereof of the tabs 50 disposed about the second code wheel 48. This indicates the current angular position of the second rotor 34. The current angular positions are supplied to a microprocessor 60. The microprocessor 60 compares the current angular positions to previously-sampled angular positions to determine respective angular displacement of the first and second rotors 32 and 34. Each angular displacement indicates whether the rotor 32 or 34 has advanced by one sector, regressed by one sector, or remained stationary. The microprocessor 60 compares the respective angular displacements of the first and second rotors 32 and 34 to obtain a relative angular displacement. By summing the relative angular displacements, the microprocessor 60 determines the change in blade pitch. The output of the microprocessor 60 can be supplied to devices such as a display panel and a pitch control system. Thus, the blade pitch measurement apparatus 30 repetitively measures the position of the first and second rotors 32 and 34 from a stationary frame of reference and repetitively subtracts an appropriate secondary measurement to yield a net angular displacement of the second rotor 32 within its rotating reference frame. Measurement from a stationary frame of reference is advantageous because the first, second, third and fourth sensors 52, 54, 56 and 58 can be kept stationary. As a result, sensor signals and power are directly accessible without having to resort to slip rings or other artifices which affect reliability.

The first code wheel 46 is now described in greater detail. A number n of tabs 50 are disposed about the circumference of the first code wheel 46. The tabs 50 are separated by an equal number n of spaces 62 of the same angular dimension. Thus, the angular dimension of each tab 50 is 180 degrees/n. Each sensor must be able to distinguish between a tab 50 and a space 62. For example, each tab 50 could be made of an opaque material such that an optical sensor could distinguish between a tab 50, which is opaque, and a space 62, which is transparent. Or, each tab 50 could be made of a ferromagnetic material, such that a magnetic sensor could distinguish between a tab 50, which is magnetic, and a space 62, which is non-magnetic. Or, the distinguishable regions can be realized by means such as deformations in the shaft 42 of the first rotor 46, holes in the shaft 42 of the first rotor 46, or tabs 50 attached directly to shaft 42 of the first rotor 46. Successive detections by sensors 52 and 54 are processed by the microprocessor 60 to yield the position and direction of rotation of the first code wheel 46 and, therefore, of the first rotor 14. A greater number n of tabs 50 increases the resolution of the blade pitch measurement apparatus 30. The number n is selected to give a precision that is compatible with the speed of the rotor and the computation rate of the microprocessor 60.

The first code wheel 46 must be constructed to withstand the stresses created by rotation. Dimensions such as thickness and diameter of the first code wheel 46 and thickness and width of the tabs 50 should be selected accordingly. The construction of the second code wheel 48 is identical to that of the first code wheel 46; therefore, a description of the second code wheel 48 is deemed unnecessary.

Now, the sensors 52, 54, 56 and 58 are described in detail. The sensors 52, 54, 56 and 58 are attached to the fan hub 18 in a manner that allows the ferromagnetic tabs 38 of the code wheel 46 or 48 to pass through their respective sensing gaps (not shown). The sensing gap of each sensor 52, 54, 56 and 58 must have sufficient clearance to allow the tabs 50 to pass through without contact. However, the clearance cannot be too great. As the tabs 50 are located further from the sensor, the resolution error in detecting the transitions from tab 50 to space 62 (or vice-versa) is increased. These practical considerations can be balanced out.

For tabs made of an opaque material, an optical sensor similar to that used in punched card readers could be employed to detect the transition from an opaque to a translucent region. In the preferred embodiment, the tabs 50 are made of a ferromagnetic material; therefore, the sensors 52, 54, 56 and 58 are magnetic sensors, which detect the transition from magnetic to non-magnetic regions. A desirable feature of the magnetic tab is that its associated magnetic sensors cannot be occluded by ordinary dirt and grime. Each sensor 52, 54, 56 and 58 can be a Hall effect device, biased by a permanent magnet, that switches from an "on" state to an "off" state when flux density increases due to the proximity of the ferromagnetic tab in the sensing gap. The Hall device is a monostable sensor whose state at system start-up is always predictable because it is determined solely by the material in the sensing gap. Such sensing devices are well known to those skilled in the art.

Figure 4:
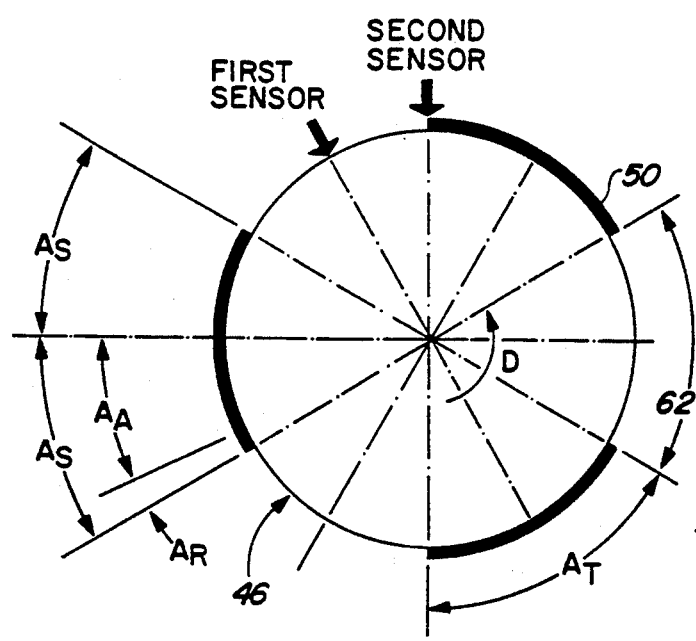
FIG. 4 is top view of the code wheel and magnetic sensors.

With reference to FIG. 4, the dimensions of the first code wheel 46 and the spatial relationship of the corresponding first and second sensors 52 and 54 are now described. Each tab 50 on the first code wheel 46 has a width $A_T$, which is equal to 180 degrees/n. Consequently, each space 62 has a width $A_T$. Each tab 50 and each space 62 is divided equally into two sectors. Thus, the width As of each sector is equal to one half the width $A_T$. The first and second sensors 52 and 54 are separated by the width As of a sector to ensure that they always measure adjacent sectors and never measure the same sector. This relationship is defined as the quadrature phase relationship, even though the first and second sensors 52 and 54 are not physically separated by ninety degrees.

The ability of each sensor 52 and 54 to detect a transition is defined by the resolution error Ar, which is the sum of all possible imprecisions due to mechanical and electromagnetic tolerances, perturbations, hysteresis, safety margin, etc. As a tab 50 gets nearer to a sensor 24 or 26, the precision of the sensor 24 or 26 to detect a transition improves. Thus, the resolution error Ar for a small clearance between a sensor 52 or 54 and a tab 50 would be less than for a large clearance. The resolution error Ar, which is measured in degrees, is based upon testing and experience. The width As of the sector that can be accurately detected by the sensor 52 or 54 is reduced by the resolution error Ar. An acquisition width Aa is defined as the width As of the sector less the resolution error Ar. Thus, the acquisition width Aa is a window on a sector in which the sector is sure to be positioned over a tab 50 or a space 62. Because the first and second sensors 52 and 54 are in the quadrature phase relationship, one sensor will always be within a zone defined by the acquisition width Aa and the other sensor will be in a zone defined by either acquisition width Aa or the resolution error Ar. A large acquisition width Aa guarantees that the position of the first rotor 32 as indicated by the first code wheel 46 is precise within one sector regardless of the resolution error Ar. For example, if the resolution error Ar is five degrees, a selection of 25 degrees for the acquisition will require a sector width As of 30 degrees, a tab width of 60 degrees and three tabs being employed.

The maximum error (E) for the indication of the blade pitch is given as:

$$E = As*ba/(R/2)$$

where ba=blade angle; and R=relative number of revolutions revolutions between the first and second rotors 32 and 34. For sector width As of thirty degrees, the maximum error E will be ±0.131 degrees when the total pitch travels 105 degrees and the relative revolutions equal 134. The maximum error E does not include calibration error, load bias error and correction for non-linearity of the mechanical linkage. These factors can be corrected by the microprocessor 60.

The outputs of the first and second sensors 52 and 54 are arranged to form a first two-bit data word DAT1, and the outputs of the third and fourth sensors 56 and 58 are arranged to form a second two-bit data word DAT2. Since a bit has two logical states, two quadrature bits define four unique positions of a given tab 50 on a code wheel 46 or 48 within any given cycle of transitions. Binary 00 indicates that the first and second sensors 52 and 54 detect a space 62; binary 01 indicates that the first sensor 52 detects a space 62 and the second sensor 54 detects a tab 50; binary 11 indicates that the first and second sensors 52 and 54 detect a tab 50; and binary 10 indicates that the first sensor 52 detects a tab 50 and the second sensor 54 detects a space 62. Thus, the data words DAT1 and DAT2 describe positions of tabs 50 on the respective first and second rotors 32 and 34, not transition counts. And, since each position is in a fixed relational series, the direction of rotation can be determined. The first and second data words DAT1 and DAT2 do not describe absolute positions of the first and second rotors 32 and 34. However, this is not necessary. The microprocessor 60 need only be supplied with the relative positions of the tabs 50 to determine the relative position of each rotor 14 and 16 and the relative motion between the first and second rotors 32 and 34.

A minimum of two sensors is required to detect direction of motion of each code wheel 46 and 48. Direction must be detected in order to discriminate between normal transitions caused by rotation as opposed to those caused by oscillations, vibrations or transient perturbations when the single sensor is near a transition. Such extraneous transitions would cause the count to increase arbitrarily even though the blade angle is not moving. For example, when the engines are running, the single sensor and corresponding rotor would undergo massive vibration. Due to these vibrations, the blade pitch would oscillate over a small angle of, for example, five degrees. The frequency of vibration is far greater than the rate at which the shaft rotates. As a result, when the transition point of the rotor is aligned with a sensor, the high-frequency vibrations cause a number of zero-crossings, in which transition point repeatedly passes the sensor. If the apparatus did not detect direction of rotation, the transition count indicate a shaft rotation for each zero-crossing and, therefore, a change in blade pitch even though none occurred. Therefore, it is important that two sensors are associated with each code wheel so that two bits of information in a quadrature phase relationship are obtained. As a result, transient perturbations merely become a true report of the current wheel position rather than a source of cumulative error.

Figure 5:
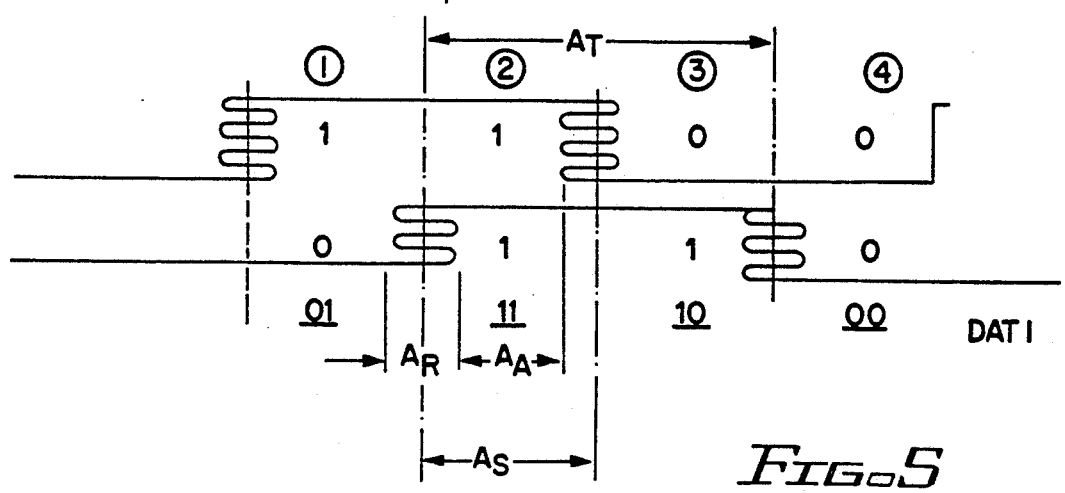
FIG. 5 is a timing diagram of output signals from the magnetic sensors when the code wheel illustrated in FIG. 4 is rotated.

FIG. 5 shows output signals provided by the first and second sensors 52 and 54 for the first code wheel 46 shown in FIG. 3. The first sensor 52 detects a space 62 and the second sensor 54 detects a tab 50; therefore, the first data word DAT 1 has a binary value of 01 (region 1). As the first code wheel 46 is rotated in the direction indicated by the arrow D, the second sensor 54 is positioned over the zone defined by the acquisition width Aa, whereby the binary output remains the same. Clearly, a greater acquisition width Aa ensures that the tab 50 will be detected. Once the tab 50 is detected by the first sensor 52, the first bit of the first data word DAT1 goes high and the binary value of the first data word DAT1 is changed to 11 (region 2). If there is vibration or other imprecisions that cause the first rotor to rotate, the edge of the tab 50 will oscillate about the first sensor 52. Thus, the value of the first data word DAT1 oscillates between 01 and 11. As the first code wheel 46 is further rotated, the first and second sensors provide the binary values 10 (region 3) and 00 (region 4). Thus produced is a binary sequence of 01,11,10,00,01 . . . , which translates to the decimal sequence 1,3,2,0,1 . . . . The decimal sequence does not agree with the logical sense of ascendency and descendancy (i.e., it does not change monotonically); however, it is translated by the microprocessor 60 to facilitate processing.

Figure 6:
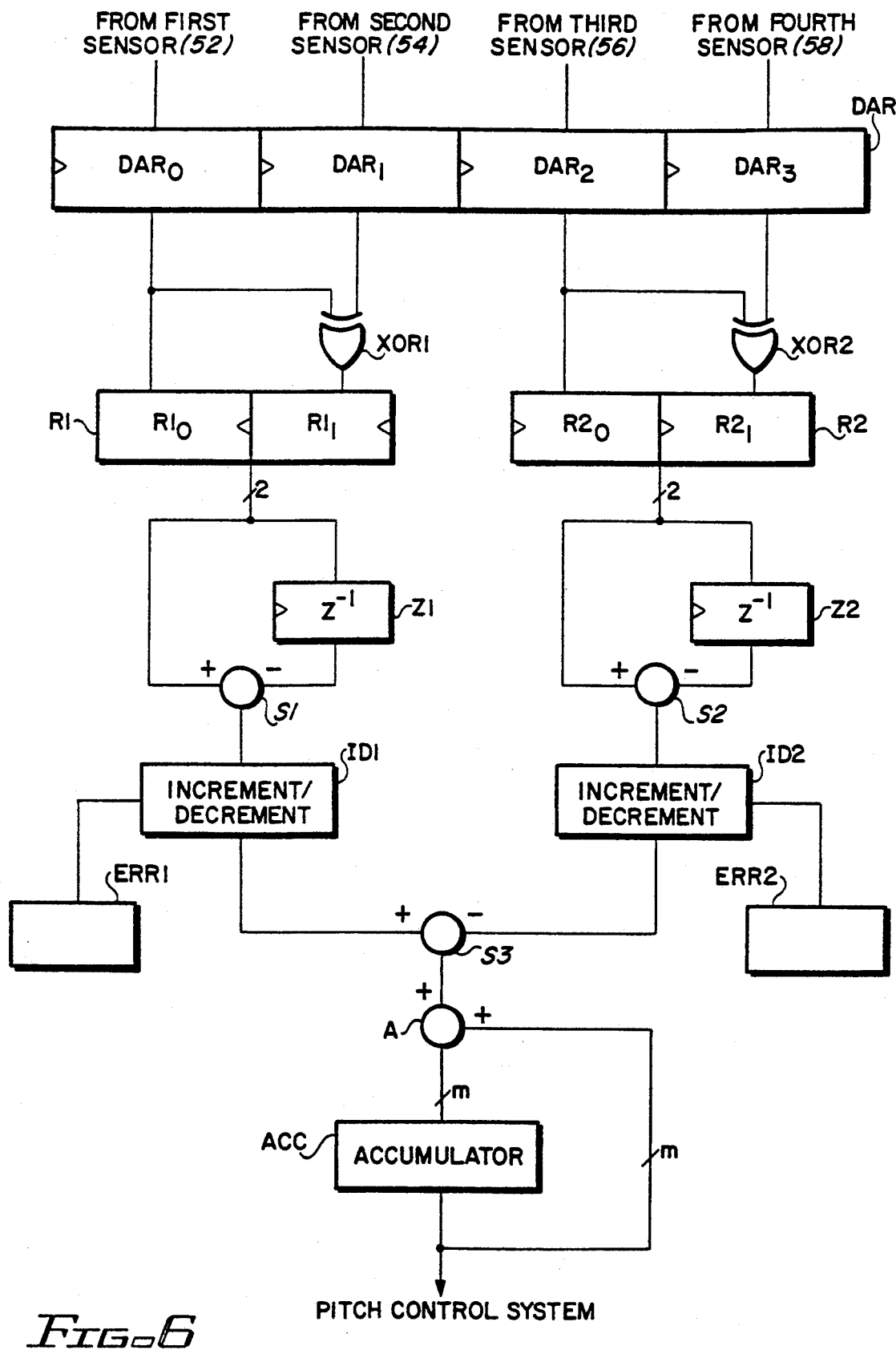
FIG. 6 shows a microprocessor, which forms a part of the measurement apparatus.

Referring now to FIG. 6, the microprocessor 60 stores the output signals provided by the sensors 52, 54, 56 and 58 in a four-bit data acquisition register DAR, which functions as a sample-and-hold circuit. The first data word DAT1 is stored in the first and second bits $DAR_0$ and $DAR_1$, respectively, of the data acquisition register DAR, and the second data word DAT2 is stored in the third and fourth bits $DAR_2$ and $DAR_3$, respectively, of the data acquisition register DAR. The first and second data words DAT1 and DAT2 are clocked into the data acquisition register DAR at a sampling rate that ensures that a sector never passes a sensor without a sample being taken, i.e. that a data word is never incremented or decremented by more than the value of one. Thus, a minimum sampling rate must be selected to guarantee that the data words DAT1 and DAT2 are precise within one sector count on each rotor regardless of the resolution error at the code wheel transitions. Otherwise, positional data will be lost. The sampling rate must also account for processing time of the microprocessor 60. The maximum allowable period (ta) between samples is ta=Aa/N. Returning to the example where the acquisition arc Aa is 25 degrees, and the shaft speed N of the second rotor is 4000 rpm, the maximum allowable period ta between acquisitions is 0.00104 seconds. Thus, the sampling, which is the inverse of the sampling period, must be at least 960 hertz. This rate is well within the ability of even the slowest microprocessor.

After sampling the output signals provided by the sensors 52, 54, 56 and 58, the microprocessor 60 translates the first and second data words DAT1 and DAT2 for normal ascendency/descendancy by changing the value "3" to "2" and vice versa. For the first data word DAT1, which indicates the position of the the first rotor 32, the first bit $DAR_0$ of the data acquisition register DAR is supplied to the first bit $R1_0$ of a first register R1, and the first and second bits $DAR_0$ and $DAR_1$ of the data acquisition register DAR are fed to respective inputs of a first exclusive OR gate XOR1, whose output is supplied to the second bit $R1_1$ of the first register R1. Thus, the second bit $DAR_1$ of the data acquisition register DAR is toggled whenever the first bit $DAR_0$ is high, thereby changing binary 11 to binary 10 and thereby changing binary 10 to binary 11. Thus, the sequence of the data words provided by the first register R1 becomes 1,2,3,0,1 . . . . It should be noted that the translation step is optional.

After correcting the first data word DAT1 for ascendency/descendancy, the microprocessor 60 determines the angular displacement of the first rotor 32 over consecutive sampling periods. The output of the first register R1 is supplied to an input of a first delay element Z1, and to the minuend input of a first subtracter S1. The output signal provided by the delay element Z1, which is delayed by one sampling period, is supplied to the subtrahend input of the first subtracter S1. The angular displacement provided by the first subtracter S1 is supplied to an input of a first increment/decrement register ID1. If the value of the input is zero, the first increment/decrement register ID1 outputs a 0, which indicates that the position of the first rotor 32 is unchanged. If the value of the input is +1 or −3, the first increment/decrement register ID1 outputs a 1, which indicates that the first rotor 32 has advanced by one sector. If the value of the input is −1 or +3, the increment/decrement register ID1 outputs a −1, which indicates that the first rotor 32 has retarded by one sector. If the value of the input is not 0,±1 or ±3, the first increment/decrement register stores a value of 1 in a first error register ERR1, which indicates a loss of data to the Pitch Control System. Therefore, if the difference is ±2, the first error register ERR1 indicates an error to the Pitch Control System, which thereafter can read data from a redundant channel.

The second data word DAT2, which provides the position of the second rotor 34, is processed in the same manner as the first data word DAT1. The third and fourth bits $DAR_0$ and $DAR_1$ of the data acquisition register DAR, which comprise the second data word DAT2, are corrected for ascendency/descendancy by a second exclusive OR gate XOR2 and stored in a second register R2. A second delay element Z2 and a second subtracter S2 determine the angular displacement of the second rotor 34 over consecutive sampling periods. A second increment/decrement register ID2 outputs a 0 if the second rotor 34 has not moved, a 1 if the second rotor 16 has advanced and a −1 if the second rotor 16 has retarded. If data has been lost, the second increment/decrement ID2 register sets a flag in a second error register ERR2.

The outputs of the first and second increment/decrement registers ID1 and ID2 are supplied to the minuend and subtrahend inputs, respectively, of a third subtracter S3, whose output indicates the relative motion between the first and second rotors 32 and 34 over consecutive sampling periods. The output of the third subracter S3 is either 0 (no relative difference), +1 (the first rotor 14 advanced over the second rotor 16 by one sector) or −1 (the second rotor 34 advanced over the first rotor 32 by one sector). An adder A adds the output of the third subtracter S3 to the contents of an accumulator ACC, whose output is the cumulative relative displacement of the blade 16. Thus, if oscillations due to vibrations occur, successive counts of +1, −1, +1, −1, etc. will cancel out, and the accumulator ACC will indicate that no change in blade angle occurred. Minimum and maximum values stored in the Accumulator ACC correspond to blade angles at their pitch limits. The accumulator ACC comprises m bits, where the integer m is selected to allow the maximum value of the cumulative relative displacement to be stored in the accumulator ACC. The maximum value of the cumulative relative displacement is dependant upon factors such as the speed of the engine shaft 36 and the gear ratio of the differential assembly 38.

The data accumulation register DAR and the first and second registers R1 and R2 are all well known to the prior art and can be realized by, for example, delay flip-flops. The accumulator ACC, however, must employ non-volatile memory since its contents are used for later applications. The adder A, the first and second delay elements Z1 and Z2 and the first, second and third subtracters S1, S2 and S3 are all well known to the prior art. The functions performed by the first and second increment/decrement registers ID1 and ID2 can be realized by a person skilled in the art. Alternately, the logic shown in FIG. 6 can be implemented in software, which can be developed readily by a person skilled in the art. The microprocessor 60, which executes the software, can be any commercially available digital signal processor. Instead of employing a dedicated microprocessor 60, however, the software can be executed by the Pitch Control System of the aircraft.

The value stored in the accumulator ACC is a precise though possibly non-linear indication of the change of blade pitch. Non-linearity, which is attributed to the mechanical linkage which actuates the blade pitch actuator 28, can be corrected by the microprocessor 60. Accuracy of the value stored in the accumulator ACC is equal to the width of a tab 50 of a code wheel 46 or 48 plus an initial objective calibration error. Biases attributable to compliance of the gears and compliance of the structure under load, wear and backlash can be determined by tests and thus can be accounted for by the Pitch Control System, which would make allowances when it commands a particular value for blade pitch. Presumably, the value commanded would be a position change based upon objective performance measurements on the engine (e.g., pressure, altitude, temperature, speed and throttle position). The Pitch Control System determines the absolute blade pitch by adding the change in blade pitch to an initial angle. This initial angle can be the pitch of the blade 16 at the end of a previous application, which angle is stored in non-volatile memory. Or, the initial angle can be a known angle, indicated by a blade stop 44. If the blade pitch is to be supplied to a display, the output of the accumulator ACC can be converted to radians or degrees. However, this conversion is not essential for the Pitch Control System to control the blade pitch.

The blade measuring apparatus 30 is calibrated automatically by the Pitch Control System. Calibration can be performed during pre-flight checkout of the aircraft. With the engines off or idling, the blade pitch is cyclically advanced and retarded between one or more blade stops 44. This checks the blade pitch actuation system at light load, and gives current position values that are compared to stop values determined at the last calibration. The current position value and the stop value determined at the last calibration are stored in non-volatile memory. As a result, manual input of data would be avoided except when equipment is replaced or changed in a way that would require data to be updated. Although the angles of the stops 44 are known, they can change due to creep, or buildup of ice or dirt. If the difference between the measured blade pitch and the stop values are not within an allowable tolerance, which can be determined by test experience or during development, the flight engineer may perform a manual calibration of the blade stop angles and thereafter request a new calibration of blade angle versus stop angle. Or, he may request a checkout of the blade position actuator's position system logic. Or he may simply reset the accumulator ACC and add its contents to the stop position that the calibration log shows to be most stable. This can be an average of, for example, the last one hundred readings.

The blade pitch measuring apparatus 30 can be backed up with redundant systems, which provide data in the event of a glitch. For example, the first and second sensors 52 and 54 would form a part of the primary system. Each code wheel 46 and 48 would be provided additionally with two pairs of backup sensors. The microprocessor 60 would process the outputs from the backup sensors independently of the outputs from the primary sensors. Resulting would be three separate sets of data. In the event the primary sensors lose data, the microprocessor 60 can use the data obtained from either or both of the two backup sensors. For example, the microprocessor 60 can take the best two out of three sets of data. This measure of redundancy further increases the reliability of the present invention.

Thus disclosed is apparatus for measuring blade pitch. An advantage of the present invention is that the blade measuring apparatus is unaffected by extraneous perturbations, oscillation and vibrations. A further advantage is that error due vibrations is minimized, and precision is proportional to one sector of a code wheel.

It will be understood that the embodiment described herein is merely exemplary and that a person skilled in the art may make many variations and modifications without departing from the spirit and scope of the invention. All such modifications are intended to be included within the scope of the invention as defined in the appended claims.

What is claimed is:

1. Apparatus for indicating change in pitch of variable pitch blades, the pitch being changed in response to a relative displacement between at least two members, each member being movable with respect to a frame of reference, said apparatus comprising:
   detecting means for providing signals indicating respective displacements of said members with respect to said frame of reference; and
   processing means, responsive to said signals from said detecting means, for determining relative displacement between said members, said relative displacement being indicative of the change in blade pitch.

2. Apparatus according to claim 1, wherein said detecting means includes first sensing means, responsive to a first member of said at least two members, for detecting a first displacement of said first member with respect to said frame, and second sensing means, responsive to a second member of said at least two members, for detecting a second displacement of said second member with respect to said frame, and wherein said processing means includes difference means for determining said relative displacement by taking the difference of said first and second displacements.

3. Apparatus according to claim 2, wherein said first sensing means includes a number n of first zones, and a member n of second zones coupled to said first member in an alternating pattern; wherein said second sensing means includes a number m of first zones, and a number m of second zones coupled to said second member in an alternating pattern, where m and n are integers greater than 1; wherein said first sensing means further includes at least one sensor, located at a first position on said frame of reference, for detecting said first and second zones on said first member, and wherein said second sensing means further includes at least one sensor, located at a second position on said frame of reference, for detecting said first and second zones on said second member, said signals from said sensors going to a first state when said first zone is detected and a second state when said second zone is detected.

4. Apparatus according to claim 3, wherein said first sensing means includes two sensors that are located at said first position in a quadrature phase relationship and whose signals form a first data word, wherein said second sensing means includes two sensors that are located at said second position in a quadrature phase relationship and whose signals form a second data word, and wherein said first and second data words each indicate four positions of said first and second members, respectively.

5. Apparatus according to claim 4, wherein each one of said first zones is made of a ferromagnetic material, wherein each one of said second zones is made of a non-magnetic material, and wherein each one of said sensors is a magnetic sensor.

6. Apparatus according to claim 4, wherein said first and second members are first and second shafts, whereby said first and second data words indicate the positions of said first and second shafts, respectively, wherein said first and second data words indicate a first sequence when their associated shaft is rotated in one direction, and wherein said first and second data words indicate a second sequence when their associated shaft is rotated in an opposite direction.

7. Apparatus according to claim 6, wherein each one of said first zones includes a magnetic tab, and wherein said magnetic tabs extend from said first and second shafts.

8. Apparatus according to claim 6, wherein said first shaft is a fan shaft that rotates said blades and wherein said second shaft is a control shaft that is rotated at an angular rate different than that of said fan shaft to change the pitch of said blades.

9. Apparatus according to claim 6, wherein said first and second shafts are first and second control shafts that are coupled to said blades by a differential assembly which adjusts the pitch of said blades when one control shaft is angularly displaced relative to the other control shaft.

10. Apparatus according to claim 4, wherein said detecting means further includes sampling means for sampling said signals from said sensors, outputs of said detecting means providing said first and second data words which indicate sampled values of said signals from said sensors.

11. Apparatus according to claim 10, wherein said processing means includes
first indicator means, responsive to said first data word, for indicating first and second values when successive samples of said first data word change in accordance with said first and second sequences, respectively, and for indicating a third value when said successive samples do not change;
second indicator means, responsive to said second data word, for indicating first and second values when successive samples of said second data word change in accordance with said first and second sequences, respectively, and for indicating a third value when said successive samples do not change, each change in values being indicative of a net displacement of one unit; and
difference means, responsive to respective outputs of said first and second indicator means, for determining the difference between values provided by said first and second indicator means, whereby said difference is indicative of said relative displacement and direction of rotation of said blades.

12. Apparatus according to claim 11, wherein said processing means further includes accumulating means, responsive to an output of said difference means, for accumulating the relative displacements, whereby an output of said accumulating means provides a signal indicative of the total change in blade pitch.

13. Apparatus according to claim 11, wherein said processing means further includes error checking means, responsive to said first and second sensing means, for checking that said first and second data words indicate either said first sequence or said second sequence.

14. Apparatus for indicating a change in pitch of variable pitch blades, the pitch being changed by differential means, responsive to first and second control shafts, for coupling a fan shaft to said blades, said blades being adjusted in one direction when said first control shaft is rotated relative to said second control shaft, said blades being turned in an opposite direction when said second control shaft is rotated relative to said first control shaft, said apparatus comprising:
first sensing means, responsive to the rotation of said first control shaft, for indicating a first displacement of said first control shaft with respect to a frame of reference;
second sensing means, responsive to the rotation of said second control shaft, for indicating a first displacement of said second control shaft with respect to a frame of reference; and
processing means, responsive to outputs of said first and second sensing means, for taking the difference of said first and second displacements, whereby said difference is indicative of the change in blade pitch.

15. Apparatus for indicating the angular displacement of a member with respect to a frame of reference, comprising:
coding means, secured to said m ember, having an alternating pattern of first and second zones, each said zone having a width As;
first and second sensor means, secured to said frame and arranged in phase quadrature, for sensing said first zones on said code wheel, said first and second sensor means providing sensor signals which indicate said first zones within a resolution error Ar;
sampling means, responsive to said first and second sensors, for sampling said sensor signals at a maximum period ta of:

$$Ta = (As - Ar)/N$$

where N is angular speed of said coding means; and
processing means, responsive to said sampling means, for processing said sampled sensor signals into said angular displacement.

* * * * *